L. S. PFOUTS.
MOTOR VEHICLE.
APPLICATION FILED DEC. 5, 1913.

1,104,446.

Patented July 21, 1914.
5 SHEETS—SHEET 1.

Witnesses
J. H. Bishop.
Hazel Owen.

Inventor
Leroy S. Pfouts.
By Bond & Miller
Attorney

L. S. PFOUTS.
MOTOR VEHICLE.
APPLICATION FILED DEC. 5, 1913.
1,104,446.
Patented July 21, 1914.
5 SHEETS—SHEET 3.
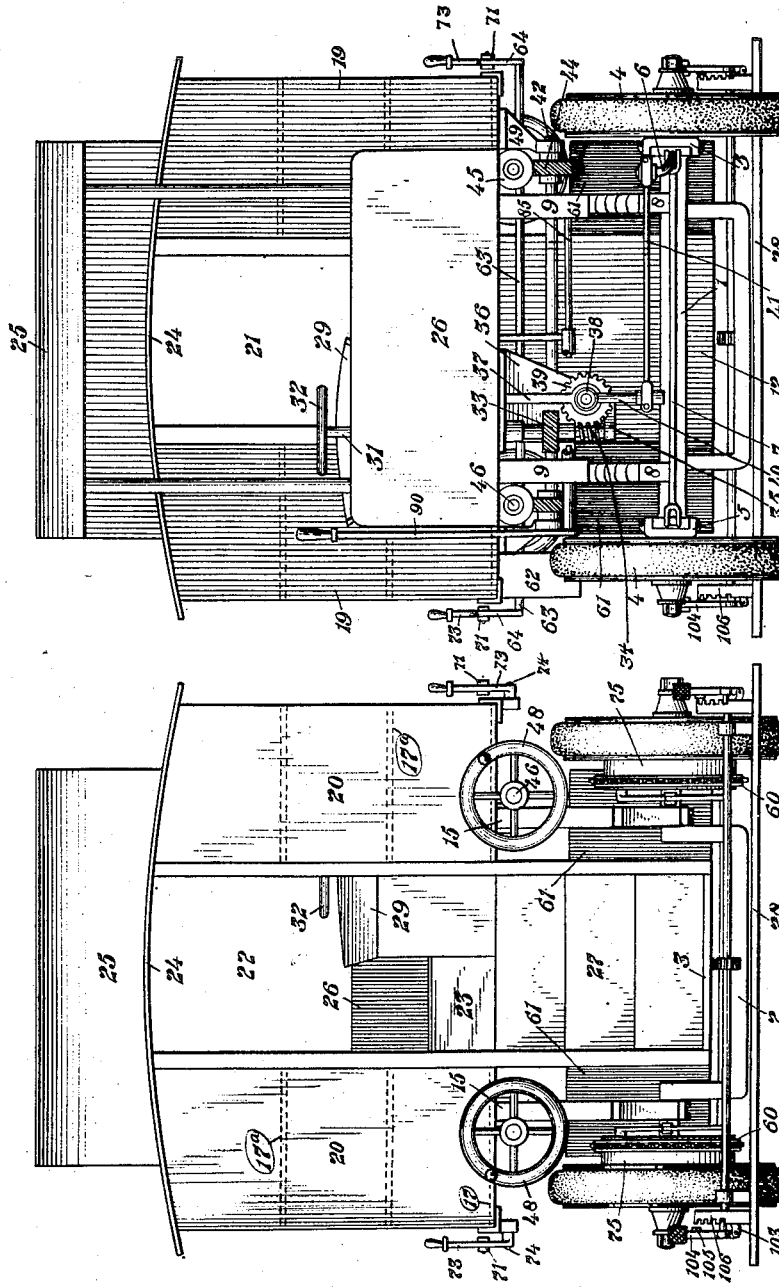
Inventor
Leroy S. Pfouts.
Witnesses
J. H. Bishop.
Hazel Owen.
By
Bond & Miller
Attorneys

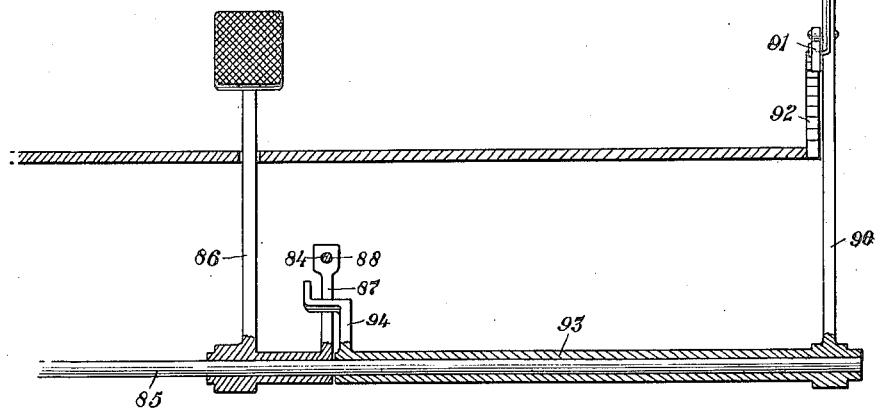
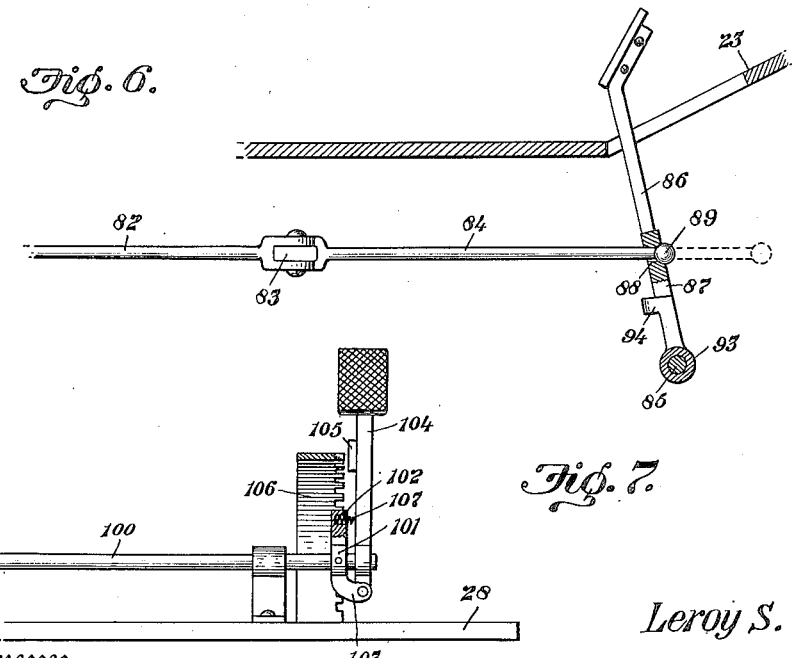

L. S. PFOUTS.
MOTOR VEHICLE.
APPLICATION FILED DEC. 5, 1913.
1,104,446.
Patented July 21, 1914.
5 SHEETS—SHEET 5.
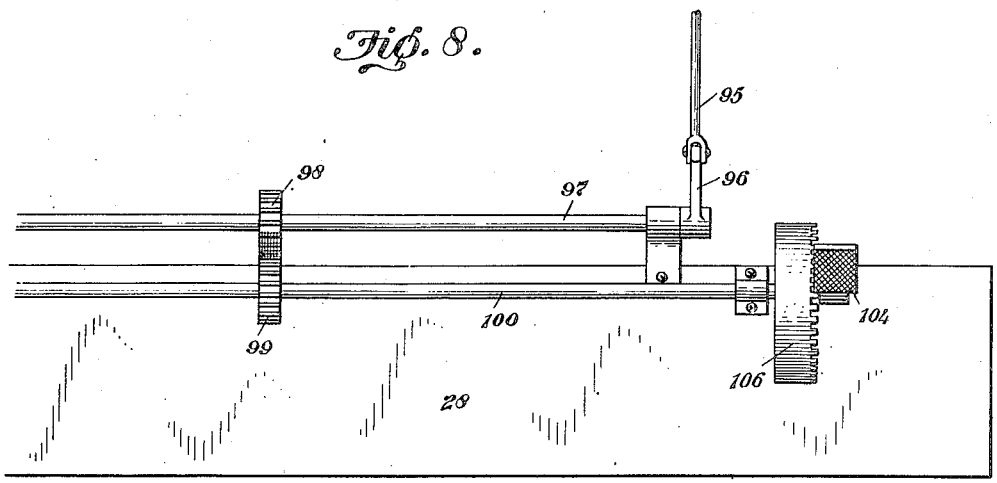
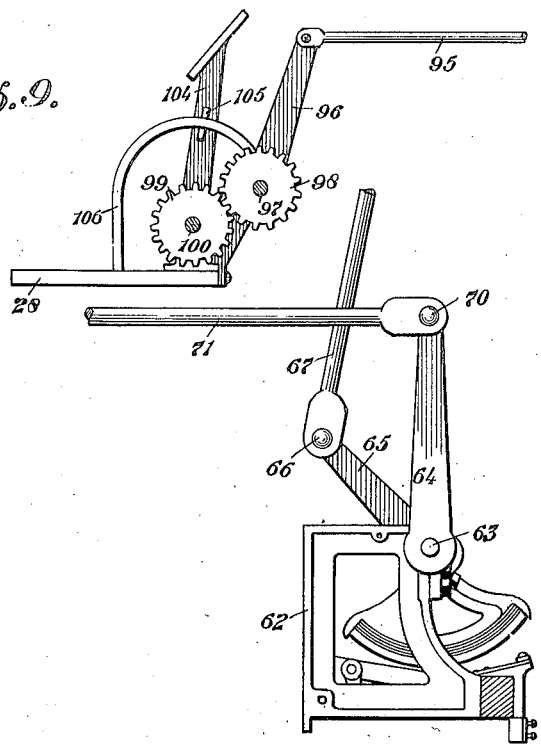
Witnesses
J. H. Bishop.
Hazel Owen.
Inventor
Leroy S. Pfouts.
By Bond + Miller
Attorneys

UNITED STATES PATENT OFFICE.

LEROY S. PFOUTS, OF CANTON, OHIO.

MOTOR-VEHICLE.

1,104,446.  Specification of Letters Patent.  Patented July 21, 1914.

Application filed December 5, 1913. Serial No. 804,801.

*To all whom it may concern:*

Be it known that I, LEROY S. PFOUTS, a citizen of the United States, residing at Canton, in the county of Stark and State of Ohio, have invented a new and useful Motor-Vehicle, of which the following is a specification.

This invention relates to improvements in motor vehicles and especially to a form of such vehicle particularly adapted for delivery wagon purposes.

The objects of the invention are, to generally improve devices of the character mentioned, to provide a motor vehicle of the delivery wagon type which may be controlled and operated either from the usual driver's seat at the front, or from the rear footboard, to improve the running gear and transmission, to improve the construction and arrangement of the parts of the vehicle so as to increase accessibility of the load carried, and to generally increase the efficiency of motor delivery wagons by the novel arrangement and combination of elements or parts as hereinafter more clearly pointed out. These objects, together with other objects readily apparent to those skilled in the art, may be attained by the construction illustrated in the accompanying drawings, although the invention may be embodied in other forms, the construction illustrated being chosen by way of example.

Figure 1:
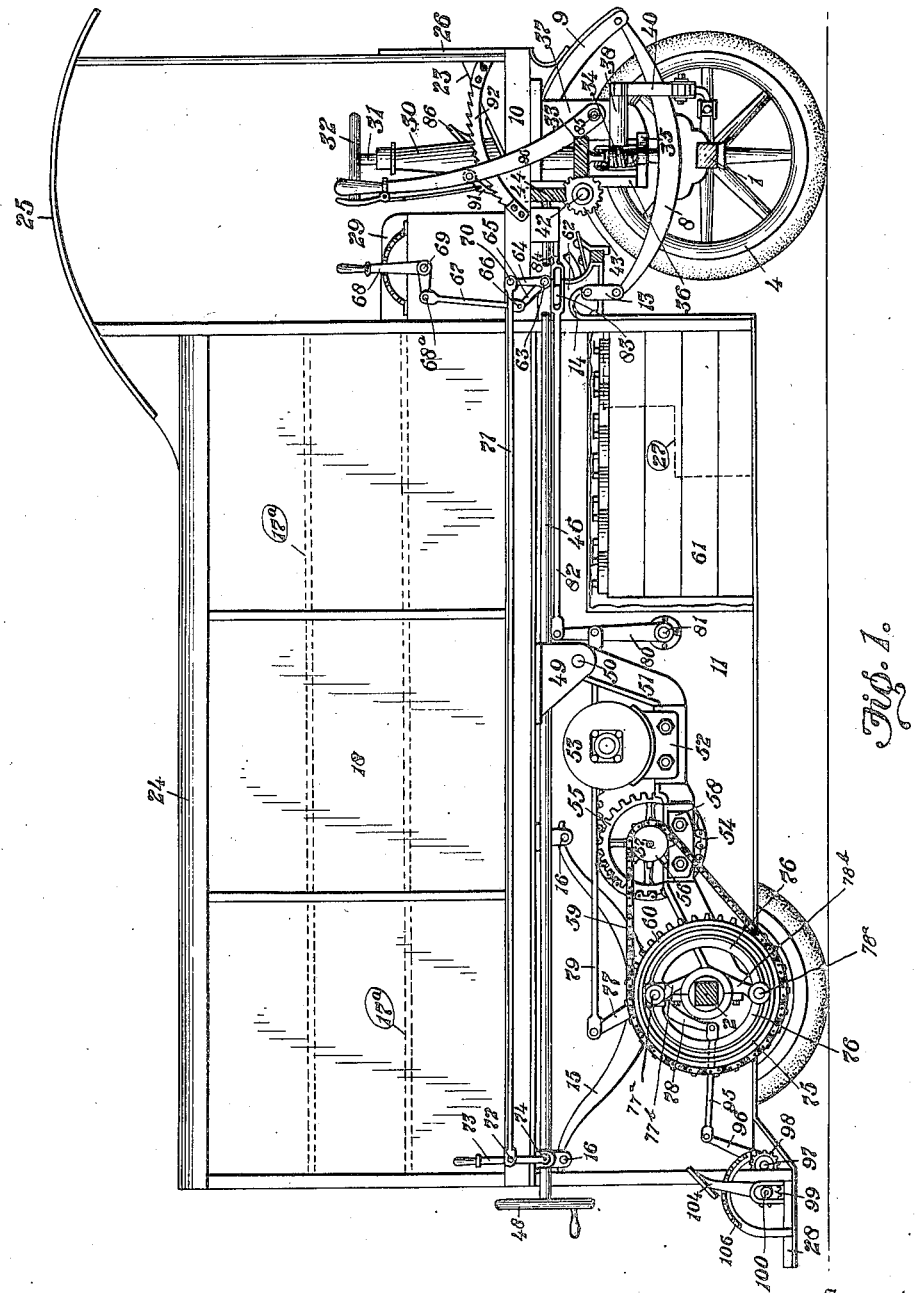
Figure 2:
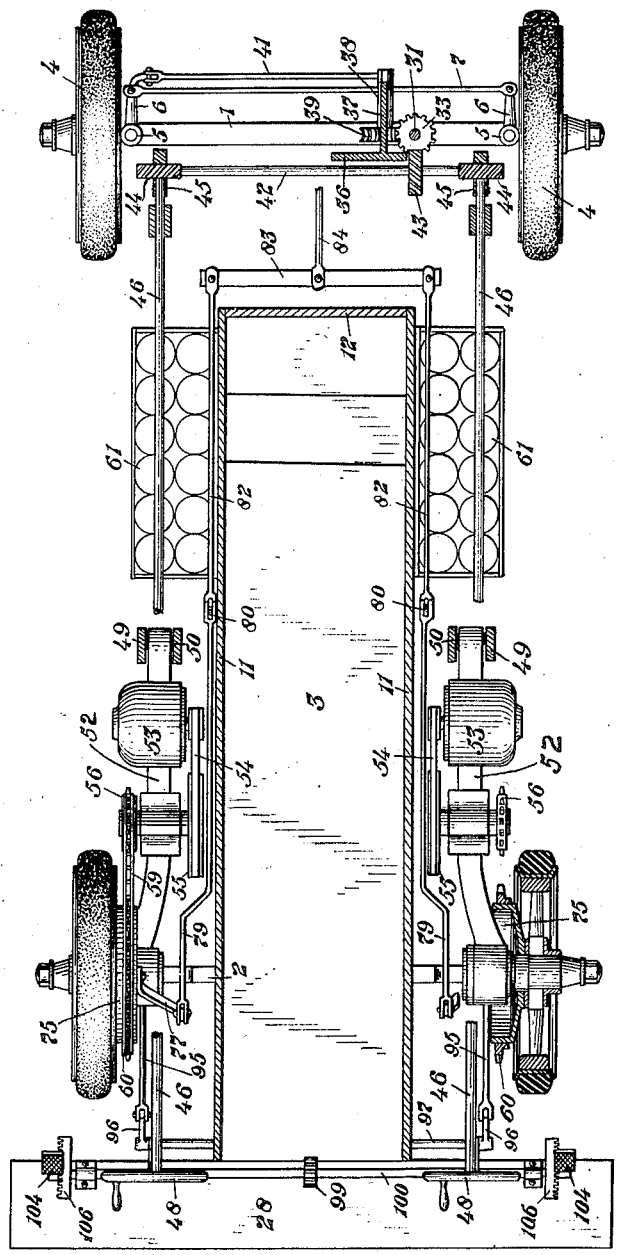

In the drawings Figure 1 is a side elevation of a motor vehicle embodying my invention, the wheels on the near side being omitted. Fig. 2 is a top plan view of the vehicle, partly in horizontal section. Fig. 3 is a front elevation. Fig. 4 is a rear elevation. Fig. 5 is a detail, from the rear, of the forward brake shaft and related parts, partly in section. Fig. 6 is a detail of the connection between the forward foot-brake-lever and main brake rod. Fig. 7 is a detail, from the rear, of one of the rear foot-brake-levers. Fig. 8 is a detail, from the top, of a portion of the foot board and rear brake shafts. Fig. 9 is a detail, from the side, of one of the rear foot-brake-levers and its connections. Fig. 10 is a detail of the controller actuating connection.

Throughout the several views similar reference numerals indicate similar parts.

The front axle 1 and rear axle 2 are of well known construction, said rear axle being of the drop type to permit the main floor 3 of the body to be hung low. At the ends of the front axle the front wheels 4 are connected thereto by means of the well known yoke and knuckle construction 5. The wheels 4 are guided by means of the usual arms 6 which are provided with the interconnecting spacing rod 7.

Upon the front axle 1 are mounted the semi-elliptic front springs 8, the forward ends of which are connected to the forward supporting arms 9 fixedly connected to the frame 10. Said frame 10 extends for the entire length of the vehicle and carries the body which consists of a lower, relatively narrow portion and an upper, relatively wide portion. The lower, relatively narrow portion comprises the main floor 3, hereinbefore referred to and the sides 11 and front end 12. The rear ends of the springs 8 are connected by means of links 13 to brackets 14 fixedly attached to the front end 12. Upon the rear axle 2 are mounted the semi-elliptic rear springs 15, having their upper ends slightly longitudinally adjustably connected to the frame 10 at 16 in any well known mechanical manner.

The sides 11 extend upwardly only to the frame 10 and at the height of said frame the load carrying floors 17, shown in dotted lines in Fig. 4 extend outwardly, providing supports for crates of milk bottles or any other load intended to be carried. The upper sides 18, the front ends 19 and the rear ends 20 inclose the upper portion of the vehicle except the front entrance 21 and the rear entrance 22. From the ends 19 forwardly extends the driver's box provided with a floor on a level with the frame 10 and its forward portion preferably inclined upwardly as at 23. Over the main portion of the body is arranged the main roof or top 24 while the roof or top 25 covers the driver's box. The dash 26 is arranged at the forward end of the driver's box in the usual manner. The steps 27, of any suitable construction, lead from the floor 3 to the floor of the driver's box at the entrance 21, and the transversely extending foot-board 28 is connected to said body and suitably supported at a slightly lower level than that of the floor 3. If desired additional load carrying frames or shelves, designated 17[a], and shown in dotted lines in the drawings, may be provided, said shelves being of any suitable construction and connected to and supported by the body of the vehicle.

In the driver's box is arranged the driver's seat 29, preferably to one side of the median line of the vehicle so as to permit free entrance and exit through the entrance 21. Fixedly mounted and rising from the floor of the driver's box is the steering post support 30 of any suitable design in which is journaled the rotatable steering post 31 provided at its upper end with the hand wheel 32 of usual construction, said wheel being conveniently positioned with reference to the driver's seat 29. Extending downwardly below the floor of the driver's box the post 31 is provided at its lower end with the fixedly mounted spiral gear 33 and worm 34. The lower end of the post is journaled in the lower flange 35 of the bracket 36 which is connected to the frame of the vehicle. Preferably formed integrally with said bracket 36 is the bracing flange 37 provided at its lower end with the box 38 in which is rotatably mounted a short shaft provided at its rear end with the fixedly mounted worm wheel 39 meshing with the worm 34, and at its forward end with the fixedly mounted crank 40 which extends downwardly, and at its lower end is operatively connected to the bar 41, which extends to one side of the vehicle and is operatively connected with one of the arms 6. It will be understood from this description that by rotation of the post 31 the front wheels 4 may be guided, this portion of the construction being not unusual.

Extending transversely to the rear of the bracket 36 is the shaft 42 which is provided, intermediate its ends, with the fixedly mounted spiral gear 43 meshing with the spiral gear 33. At each end of the shaft 42 is also fixedly mounted a spiral gear 44, each of which gears meshes with the spiral gear 45 fixedly mounted on the forward end of the auxiliary, horizontal steering post 46. One of said auxiliary posts is arranged on one side of the vehicle and the other on the other side, said posts being rotatably mounted in suitable boxes and said posts being provided at their rear ends with the auxiliary hand wheels 48 which are vertically disposed as distinguished from the horizontally disposed hand wheel 32.

It will be apparent from the above description that the front wheels may be guided by manipulation of the hand wheel 32 when the operator is in the driver's box or by manipulation of either of the hand wheels 48 when the operator is standing upon the foot-board 28 at the rear of the vehicle. On each side of the vehicle intermediate the front and back wheels is a bracket 49 fixedly attached to the body of the vehicle and to the frame thereof beneath the outwardly extending floor 17. To each of said brackets is pivotally connected at 50 a thrust frame 51 preferably consisting of a casting adapted to support an electric motor and intermediate gearing for operative connection between said motor and the rear wheel of the vehicle on that side. In the drawings it will be noted that the frame 51 extends downwardly from the bracket 49 and then rearwardly, to the axle 2 with which connection is made in such manner that the thrust of the axle 2 when the rear drive wheels are rotated will be transmitted through the thrust frame 51 to the bracket 49, thus impelling the vehicle; the point of application of thrust to the vehicle thus being intermediate the front and rear wheels. As the rear springs 15 are compressed under load, or when the vehicle is running, pivotal connection at 50 will permit the rear end of the thrust frame 51 to move up or down to correspond with the action of the said springs.

Connected to the frame 51, as by the bracket 52, is the motor 53 which is operatively connected by means of the chain 54 which passes around the sprocket 55 which, together with the sprocket 56, is fixedly mounted upon the shaft 57 journaled in the bearing connected to the frame 51 by the bracket 58. The chain 59 provides operative connection between the sprocket 56 and the sprocket 60 of the rear wheel and it will be understood that by means of the mechanism just described the rear wheel may be driven by the operation of the motor 53. To supply the motor with the necessary current a storage battery 61 is mounted on the side of the lower portion of the vehicle body at the forward end in any suitable mechanical manner, it being possible to conveniently arrange said storage battery within the general outline of the vehicle by reason of the narrowness of the lower portion of the vehicle body. It will, of course, be understood that the two sides of the vehicle are similarly constructed, a battery, motor, gearing and thrust frame being arranged upon each of the two sides of the body.

For the purpose of controlling the motors the controller 62 is provided, the batteries, controller and motors being suitably electrically connected. No claim is herein made for the details of construction of said controller or the wiring of said batteries, controller and motors, and no further detail description is here deemed necessary.

The controller is arranged just in front of the front end 12 and beneath the floor of the driver's box and is provided with the controller shaft 63 extending transversely of the vehicle substantially as far as the upper side 18. Oscillation of said shaft controls the current in the manner that is well understood by those skilled in the art. At the outer ends of the shaft 63 are the levers 64 fixedly connected to said shaft while intermediate the ends is the lever 65 also fixedly connected to said shaft. To the lever 65 at 66 the bar 67 is pivotally connected, the upper end of said bar being pivotally connected at 68ª to the bell crank controller lever 68 pivotally connected at 69 and provided with a grip within convenient reach of the operator when seated in the driver's seat 29.

Pivotally connected at 70 to each of the levers 64 is the rearwardly extending connecting bar 71, the rear end of which is pivotally connected at 72 to a rear controller lever 73 pivotally connected at 74 to a suitably fixed portion of the vehicle, the lever 73 being within convenient reach of the operator when standing on the foot-board 28 and manipulating the corresponding rear hand wheel. It will thus be understood that whether the lever 68 or either of the levers 73 is operated the shaft 63 will be oscillated to actuate the controller. The controller may thus be conveniently operated either from the driver's box or at either side of the rear end of the vehicle.

The rear wheels are provided with brake drums 75 upon the inner sides of which the expanding friction shoes 76 are applied in the manner well known to those skilled in the art, said shoes being actuated by movement of the levers 77 and 78 connected to a common shaft, 77ª journaled in an upper extension 77ᵇ formed integrally with the thrust frame 51 at the rear end thereof. The shoes 76 are pivotally connected at 78ª to a similar lower integral extension 78ᵇ of said thrust frame, the said shoes 76 being thus pivotally connected to each other and to the stationary portion 78ᵇ. To the upper end of each lever 77 is pivotally connected a bar 79 which extends forwardly and is pivotally connected to an intermediate lever 80 between the ends of the same. The lower end of each lever 80 is pivotally connected at 81 to a stationary portion of the vehicle, as for instance the side 11, and to the upper end of said lever 80 is pivotally connected a bar 82, which extends forward to a point in front of the front end 12. Extending transversely, the yoke 83 is connected at its ends to the forward ends of the two bars 82, and substantially intermediate the ends of the yoke 83 the main brake rod 84 is connected thereto and extends forwardly.

Beneath the floor of the driver's box and extending transversely of the vehicle is the forward brake shaft 85 upon which is rotatably mounted the forward foot-brake-lever 86, the upper end of which extends through the floor of the driver's box into convenient position for operation by the foot of the operator. Formed integrally with the lever 86 is the off-set, auxiliary lever 87, the upper end of which is provided with the aperture 88 through which the main brake rod 84 extends, said main brake rod being provided at its forward end with the integral ball portion 89 adapted to be received into the socket-shaped forward edge of the aperture 88, as shown in Fig. 6. The aperture 88 permits the rod 84 to slide forwardly therethrough as shown in dotted lines in Fig. 6, and as will hereinafter be more fully explained, but it will be understood that forward movement of the lever 86 will produce simultaneous forward movement of the auxiliary lever 87, carrying forward the brake rod 84 when it is in the position illustrated in full lines in Fig. 6. As will be understood from the description hereinbefore given forward movement of the rod 84 will produce simultaneous forward movement of both of the bars 82 and of both of the bars 79, thus throwing both of the levers 77 forward and applying the brakes.

For the purpose of providing means for locking the brakes in position the hand-brake-lever 90, adapted to be locked against backward movement by means of the pawl 91 and segmental rack bar 92 in the manner well understood by those skilled in the art, is provided. Said lever 90 is fixedly connected to or formed integrally with the sleeve 93, which is rotatably mounted upon the shaft 85 and extends to the auxiliary lever 87, at which point said sleeve 93 is provided with the integral or fixedly connected off-set arm 94 adapted to engage the rear side of said lever 87, so that forward movement of the lever 90 will cause forward movement of the arm 94 and thus produce forward movement of the lever 87, whereby the rod 84 may be drawn forward by hand as well as by the foot, the upper end or grip of the lever 90 being within convenient reach of the operator when seated in the seat 29. It will be understood that when the lever 90 is in the rearward position illustrated in Fig. 1 the brakes will, so far as said lever is concerned, be free or unlocked, it being possible, however, to temporarily apply the brakes by pressing forwardly upon the lever 86 with the foot, and holding said lever forward with the foot so long as it is desired to apply the brakes. Should it be desired to lock the brakes the lever 90 is used so that the brakes may be applied and held while the operator leaves the vehicle, and will be held in locked position until release of the pawl 91 from the rack bar 92, as will be well understood. It is desirable that the brakes may also be applied when the operator is at the rear end of the vehicle on the foot-board 28. To accomplish this each lever 78 is pivotally connected to a rearward extending bar 95 which bar is pivotally connected at its rear end to the upper end of a lever 96. Both of said levers 96 are fixedly mounted upon the transversely extending rotatable shaft 97 which is provided intermediate its ends with the fixedly mounted pinion 98 meshing with the pinion 99 fixedly mounted upon the transversely extending rotatable brake shaft 100.

On each end of the shaft 100 is fixedly mounted the lever attaching member 101 provided with an upward extension having an outwardly open spring receiving aperture 102, and a downwardly and outwardly extending arm 103. To each of said arms 103 is pivotally connected a rear foot-brake-lever 104 which is provided with an aperture adapted to slidingly receive the end of the shaft 100, and provided also with an inwardly extending tooth or lug 105 adapted to engage the teeth of the stationary rack 106. The spring 107 in the aperture 102 bears against the lever 104 to normally maintain same in position free from the rack 106. The operator may, however, place his foot upon the upper end of the lever 104 and press same forward, rotating the brake shaft 100, thus rotating the pinions 98 and 99, shaft 97, and drawing backward the upper ends of the levers 96, thus drawing the bars 95 backward and applying the brakes by a corresponding backward movement of the lever 78. When the brakes have been sufficiently set, if it is desired to lock the brake in set condition sidewise movement of the foot of the operator will throw the lug 105 into engagement with one of the teeth of the rack 106, whereupon the frictional engagement as between said lug and said tooth will overcome the tendency of the spring 107 to push the lever 104 outwardly, and the brakes will thus be set until the operator intentionally moves the top of the lever 104 outwardly to free the lug 105 from the said rack 106.

The operation of the device may be conveniently illustrated by assuming that the vehicle is to be used for the purpose of delivering milk in the city. Crates of bottles of milk may be arranged upon the load carrying floors 17 and the shelves 17ª at the milk depot, whereupon the driver takes his place in the driver's box and by manipulation of the hand wheel 32, controller lever 68, foot-brake-lever 86 and hand brake lever 90 drives the vehicle rapidly through the city to his allotted district or section of distribution. Having arrived at his first customer he leaves the driver's box, preferably descending the steps 27, and delivers the bottles, returning to the vehicle and taking his position on the foot-board 28 at the rear end where, by manipulation of the hand wheel 48, controller lever 73 and foot-brake-lever 104, on either side of the vehicle, he may drive from residence to residence, the vehicle being under perfect control and the driver in position to quickly make deliveries upon arriving at his various customers. It will thus be seen that the vehicle may be controlled and operated from any one of three positions, either in the driver's box, or at either side at the rear of the vehicle. At the same time the operating and controlling devices are so arranged as to be conveniently and easily manipulated. When deliveries have been completed the driver may then again assume his position in the driver's box for the comparatively long trip back to the milk depot or station, being in the best position for relatively fast driving on the outgoing and return trips.

It should be pointed out that a gasolene or other motor may be substituted for the electric motor for the purpose of propelling the vehicle, while at the same time retaining the principal advantages and novel improvements of my invention.

While I have illustrated and described the best mode in which I have contemplated embodying my invention, I do not desire to be limited to the details of such disclosure, for many changes may be made as circumstances require or experience suggests, without departing from the spirit of the invention, within the scope of the appended claims.

I claim:—

1. A motor vehicle provided with a single driver's station at the forward end thereof and with a plurality of driver's stations at the rear end thereof, the said stations at the rear arranged at the two sides of the vehicle respectively, and each of the stations provided with guiding, controlling and braking means.

2. A motor vehicle provided at the forward end with an elevated driver's station equipped with a seat and guiding, controlling and braking means disposed for manipulation by the driver when seated in said seat, and a lower driver's station equipped with a transversely extending foot board at the rear of said vehicle and guiding, controlling and braking means at the two sides of the vehicle disposed for manipulation by the driver when standing on said foot board.

3. A motor vehicle provided with a load carrying portion having a low level floor extending longitudinally in the midst thereof, a forward, high level driver's station accessible from said floor and provided with a seat and guiding, controlling and braking means, and a rear low level driver's station accessible from said floor and provided with guiding, controlling and braking means, said means being independently operable at either station.

4. In a motor vehicle, in combination with the main frame, driving axle and driving wheels thereon, thrust frames on the two sides of said main frame and having their upper ends connected to said main frame and their lower ends connected to said axle, and an electric motor and transmission gearing mounted upon each of said thrust frames, said transmission gearing on each frame consisting of a counter-shaft journaled in a bearing connected to said thrust frame and provided with a first and a second sprocket, chain belt connection between said motor and said first sprocket, and chain belt connection between the second sprocket and the driving wheel on the same side of the vehicle.

5. In a motor vehicle, in combination with the main frame, driving axle and driving wheels thereon, two thrust frames arranged upon the two sides of said main frame, respectively, each thrust frame having one end connected to said main frame and its other end connected to said driving axle, and the intermediate portion of said thrust frame constituting a motor and transmission gearing mounting portion, an independent motor and transmission gearing mounted on each of said thrust frames, the motor, transmission gearing and driving wheel on each side of the vehicle operatively connected together.

6. In a motor vehicle, in combination with the main frame and rear axle and driving wheels thereon, thrust frames on the two sides of the vehicle, each frame having its upper, forward end pivotally connected to the main frame and extending thence downwardly and thence rearwardly and connected to the rear axle, said frame provided at the rear end with an upper and lower extension, a brake drum and a driving sprocket connected to the driving wheel, friction shoes operatively connected to said upper and lower extensions and adapted for frictional engagement with said brake drum, means for actuating said shoes and a motor and power transmitting mechanism mounted on said thrust frame, and having operative engagement with said driving sprocket, whereby both the driving and braking mechanism is mounted on the same integral frame.

7. In a motor vehicle, in combination with the main frame and rear axle and driving wheels thereon, thrust frames on the two sides of the vehicle, each frame connected to the main frame and extending thence to and connected to said rear axle, a motor and power transmitting mechanism mounted on said frame and having operative driving connection with the driving wheel on the same side of the vehicle and braking mechanism connected to said frame and adapted for operative braking engagement with said wheel.

8. In a motor vehicle, in combination with the main frame and rear axle and driving wheels thereon, independent thrust frames on the two sides of said vehicle connected to said main frame and to said rear axle and an independent motor, power transmitting mechanism and braking mechanism mounted on each of said thrust frames, said power transmitting mechanism adapted to transmit driving power from the motor to the wheel and the braking mechanism adapted to frictionally brake the wheel on the same side of the vehicle.

9. In a motor vehicle, a forward, elevated driver's station and a rear, lower driver's station, a motor for driving said vehicle, a controller for controlling said motor, said controller provided with a controller shaft, levers fixedly connected to said shaft and adapted, when moved, to actuate said shaft, connecting bars connected to said levers and extending to said forward and said rear driver's stations, and manually operable levers at said stations connected to said connecting bars and adapted, when actuated, to actuate said bars, levers and controller shaft.

10. In a motor vehicle, a forward, elevated driver's station and two rear, lower driver's stations, one on each side of the vehicle, a motor for driving said vehicle, a controller for controlling said motor, said controller provided with a controller shaft, extending transversely from side to side of said vehicle, said controller shaft, on one side of said vehicle, provided with a first and second lever fixedly connected and at the other side provided with a third lever also fixedly connected, first manually operable means at the forward driver's station and a connecting rod connecting said first lever with said manually operable means, second and third manually operable means at the two rear stations, respectively, and connecting means, extending along the two sides of the vehicle and operatively connecting said second and third levers with said second and third manually operable means, whereby said controller shaft may be actuated from any one of the three driver's stations.

11. In a motor vehicle, a driver's station and second and third driver's stations to the rear of said first station and at the two sides, respectively, of said vehicle, a motor for actuating said vehicle, a controller for said motor, manually operable means for actuating said controller at each of the three stations, and mechanical means operatively connecting each of said manually operable means and said controller.

12. In a motor vehicle, a first driver's station and second and third driver's stations to the rear of said first station and at the two sides, respectively, of said vehicle, steering means for said vehicle, including a transversely extending, rotatable common shaft, a first steering post provided with a hand wheel at said first station and having operative connection with said shaft and second and third steering posts having operative connection with said shaft, extending to said second and third stations, respectively, and provided with hand wheels at said stations, whereby said common shaft may be actuated by rotation of any of said hand wheels.

13. In a vehicle of the character described, provided with first, second and third driver's stations and braking mechanism, a first pedally operable actuating and manually operable actuating means at the first station, and two pedally operable actuating means at the second and third stations, respectively, and mechanical means operably connecting all of said actuating means with said braking mechanism, all of said pedally actuating means being operable without actuating said manually operable means, and the pedally operable means of the second and third stations being operable without actuating either pedally or manually operable means of the first station.

In testimony that I claim the above, I have hereunto subscribed my name in the presence of two witnesses.

LEROY S. PFOUTS.

Witnesses:
 WILLIAM H. MILLER,
 J. W. CRAINE.